(12) United States Patent
Lee et al.

(10) Patent No.: US 9,207,655 B2
(45) Date of Patent: Dec. 8, 2015

(54) ELECTRONIC STABILIZER DEVICE AND METHOD FOR STABILIZATION OF OBJECTS

(71) Applicants: Hou-Hsien Lee, New Taipei (TW);
Chang-Jung Lee, New Taipei (TW);
Chih-Ping Lo, New Taipei (TW)

(72) Inventors: Hou-Hsien Lee, New Taipei (TW);
Chang-Jung Lee, New Taipei (TW);
Chih-Ping Lo, New Taipei (TW)

(73) Assignees: Patentcloud Corporation, Shenzhen (CN); Patentcloud Co. Limited, Kwun Tong (HK)

( * ) Notice: Subject to any disclaimer, the term of this patent is extended or adjusted under 35 U.S.C. 154(b) by 702 days.

(21) Appl. No.: 13/648,619

(22) Filed: Oct. 10, 2012

(65) Prior Publication Data
US 2013/0173069 A1    Jul. 4, 2013

(30) Foreign Application Priority Data

Dec. 29, 2011  (TW) .............................. 100149666 A

(51) Int. Cl.
*G05B 15/00*    (2006.01)

(52) U.S. Cl.
CPC ...................................... *G05B 15/00* (2013.01)

(58) Field of Classification Search
CPC ....................................................... G05B 15/00
USPC ......................................................... 700/279
See application file for complete search history.

(56) References Cited

FOREIGN PATENT DOCUMENTS

| | | |
|---|---|---|
| CN | 102219045 A | 10/2011 |
| TW | 200728945 A | 8/2007 |

*Primary Examiner* — Robert Fennema
*Assistant Examiner* — Fenyang Stewart
(74) *Attorney, Agent, or Firm* — Novak Druce Connolly Bove + Quigg LLP

(57) ABSTRACT

In a method for stabilization of an object using an electronic stabilizer device, which includes an electric gyroscope, a driver device and a counterweight device. The method measures orientation data of the object using the electric gyroscope, analyzes the orientation data of the object to obtain a current obliquity of the object, and generates a first control signal to drive the driver device according to the current obliquity when the current obliquity is equal to a reference angle. The method controls the counterweight device to change a center of gravity of the object through the driver device, and measures an adjusted obliquity of the object using the electric gyroscope. The method generates a second control signal to drive the driver device when the adjusted obliquity changes, and controls the counterweight device to dynamically adjust the center of gravity of the object.

18 Claims, 5 Drawing Sheets

ELECTRONIC STABILIZER DEVICE AND METHOD FOR STABILIZATION OF OBJECTS

BACKGROUND

1. Technical Field

Embodiments of the present disclosure relate to stabilization mechanisms, and particularly to an electronic stabilizer device and a method for stabilization of an object by balancing or rebalancing the object.

2. Description of Related Art

Objects, including electronic devices, measuring machines, vehicles or household appliances may topple or fall over when subjected to an earthquake, hurricane, collision, or other such violent incidents. The object may be destroyed or rendered inoperable by such an event. However, there is no stabilization mechanism to rebalance the object as a protection against such events. Therefore, there is room for improvement in the art.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean "at least one."

In the present disclosure, the word "module," as used herein, refers to logic embodied in hardware or firmware, or to a collection of software instructions, written in a program language. In one embodiment, the program language may be Java, C, or assembly. One or more software instructions in the modules may be embedded in firmware, such as in an EPROM. The modules described herein may be implemented as either software and/or hardware modules and may be stored in any type of non-transitory computer-readable medium or other storage system. Some non-limiting examples of a non-transitory computer-readable medium include CDs, DVDs, flash memory, and hard disk drives.

Figure 1:
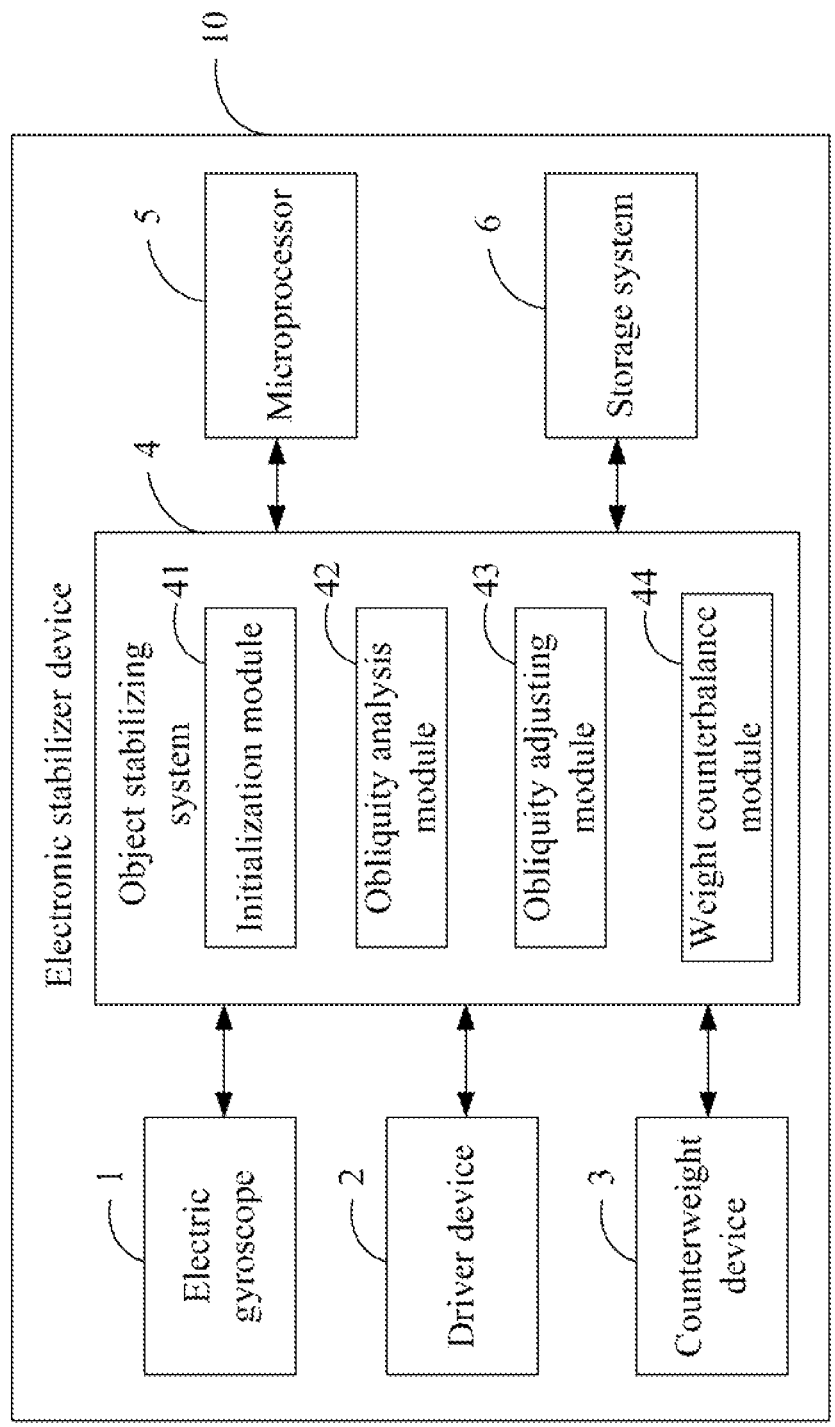
FIG. 1 is a block diagram of one embodiment of an electronic stabilizer device.

FIG. 1 is a block diagram of one embodiment of an electronic stabilizer device 10. In the embodiment, the electronic stabilizer device 10 includes an electric gyroscope 1, a driver device 2, a counterweight device 3, an object stabilizing system 4, at least one microprocessor 5, and a storage system 6. The object stabilizing system 4 communicates with the electric gyroscope 1, the driver device 2, and the counterweight device 3. In one embodiment, the object stabilizing system 4 may include a plurality of functional modules that are stored in the storage system 6 and executed by the at least one microprocessor 5. FIG. 1 is only one example of the electronic stabilizer device 10, other examples may include more or fewer components than those shown in the embodiment, or have a different configuration of the various components.

Figure 2:
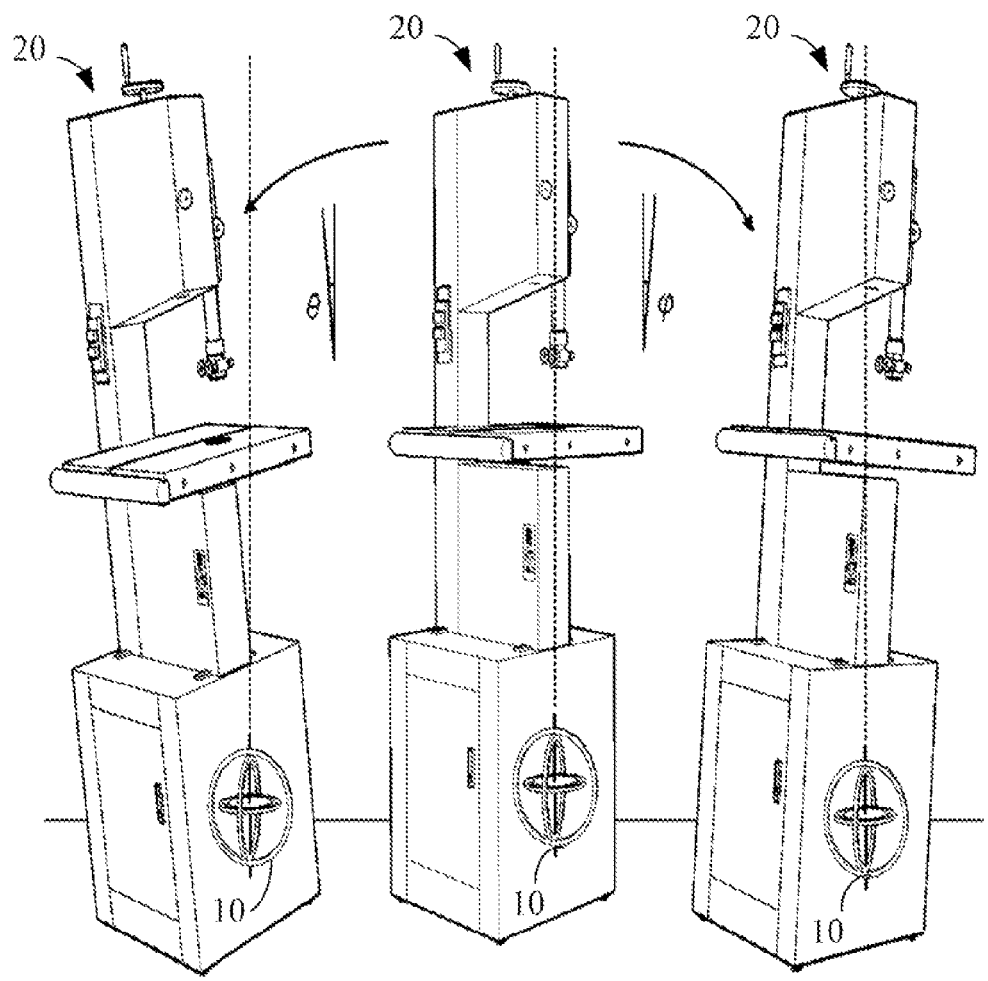
FIG. 2 is one example of a measuring machine object.

The electronic stabilizer device 10 is used to stabilize an object by balancing or rebalancing the object after the object is subjected to an impact force. In the embodiment, the impact force may be the same force as from an earthquake, hurricane, impact, or collision, or other violent events. In one embodiment, the objet may be an electronic device, a measuring machine, a vehicle on the road or a household appliance. In this embodiment, the object is a measuring machine 20 in a warehouse. FIG. 2 is only one example of the object in the form of a measuring machine 20, but does not limit the scope and spirit of the present disclosure. The measuring machine 20 is equipped with the electronic stabilizer device 10 for stabilizing the measuring machine 20.

The electric gyroscope 1 is an integrated circuit (IC) chipset for measuring orientation data of the object based on conservation of angular momentum. In the embodiment, the orientation data of the object may include an obliquity of the object, an angular velocity of the object, and a rotational direction of the object. In the embodiment, the obliquity of the object is defined as a deviation from vertical/center of gravity of the object. The electric gyroscope 1 measures the obliquity of the object and the angular velocity of the object when the object receives the impact force. Referring to FIG. 2, the electric gyroscope 1 can measure a left obliquity angle "θ" and a right obliquity angle "δ" when the measuring machine 20 receives the impact force.

The driver device 2 is a driving motor that controls the counterweight device 3 to change a center of gravity of the object to obtain a counterweight of the object against the source direction of the impact force. The counterweight of the object can counterbalance the object when the object receives the impact force.

Figure 3:
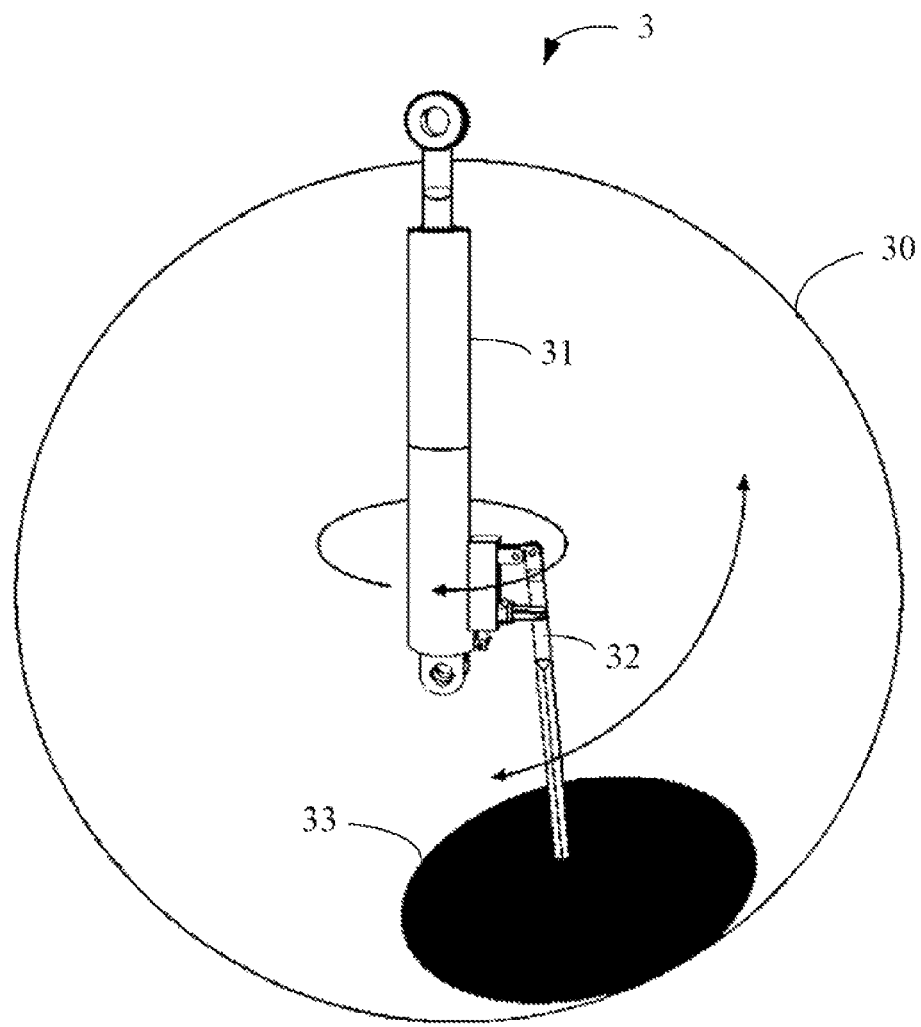
FIG. 3 is a schematic diagram illustrating one embodiment of a counterweight device included in electronic stabilizer device of FIG. 1.

The counterweight device 3 is an electric hydraulic jack that reallocates the weight of the object to change the center of gravity of the object when the object receives the impact force. FIG. 3 is a schematic diagram illustrating one embodiment of the counterweight device 3. In the embodiment, the counterweight device 3 includes a spherical shell 30, a first joint lever 31, and a second joint lever 32 that is equipped with a weight 33. The first joint lever 31 can move up and down, and the second joint lever 32 can rotate through 360 degrees.

The microprocessor 5 may be a microcontroller unit that processes computerized instructions and data to balance stabilization of the object. In one embodiment, the storage system 6 may be an internal storage system, such as a random access memory (RAM) for the temporary storage of information, and/or a read only memory (ROM) for the permanent storage of information. In some embodiments, the storage system 6 may also be an external storage system, such as an external hard disk, a storage card, or a data storage medium.

In one embodiment, the object stabilizing system 4 includes an initialization module 41, an obliquity analysis module 42, an obliquity adjusting module 43, and a weight counterbalance module 44. The modules 41-44 may comprise computerized instructions in the form of one or more programs that are stored in the storage system 5 and executed by the at least one microprocessor 6.

Figure 5:
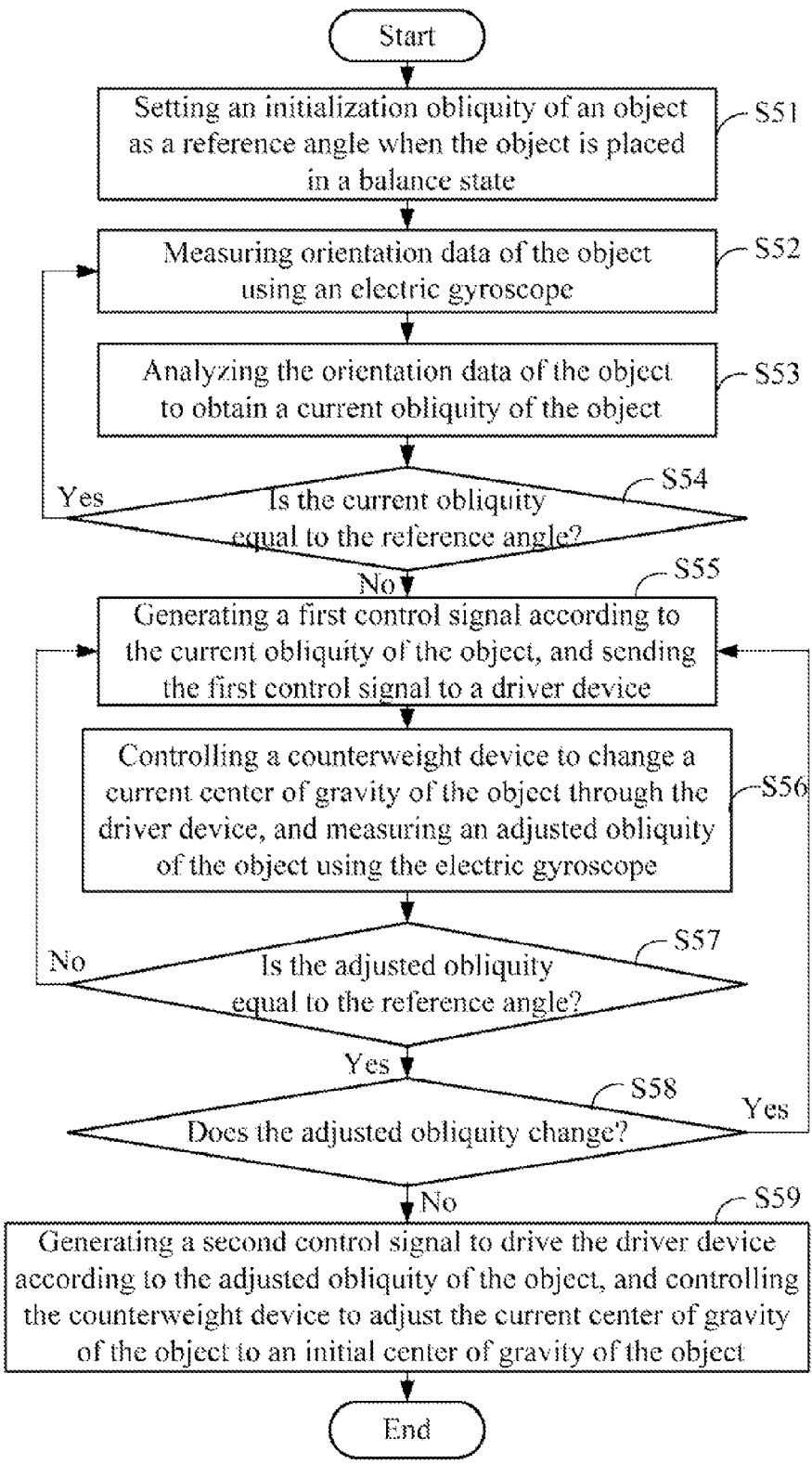
FIG. 5 is a flowchart of one embodiment of a method for stabilization of an object by rebalancing the object using the electronic stabilizer device of FIG. 1.

FIG. 5 is a flowchart of one embodiment of a method for stabilization of an object by balancing or rebalancing the object using the electronic stabilizer device 10 of FIG. 1. Depending on the embodiment, additional steps may be added, others removed, and the ordering of the steps may be changed.

In step S51, the initialization module 41 sets an initialization obliquity of the object as a reference angle when the object is placed in a balance state. In the embodiment, if the object is placed on a horizontal surface, the initialization module 41 may set the reference angle as zero degrees.

In step S52, the obliquity analysis module 42 measures orientation data of the object using the electric gyroscope 1 when the object receives an impact force. In the embodiment, the impact force may be sourced from an earthquake, hurricane, impact, or collision, or other violent events. The orientation data of the object may include a current obliquity of the object, a current angular velocity of the object, and a rotational direction of the object. Referring to FIG. 2, the obliquity analysis module 42 can obtain a left obliquity angle "θ" and a right obliquity angle "δ" measured by the electric gyroscope 1 when the measuring machine 20 receives the impact force.

In step S53, the obliquity analysis module 42 analyzes the orientation data of the object to obtain a current obliquity of the object. In the embodiment, the obliquity analysis module 42 compares the current obliquity of the object with the reference angle to constantly determine any deviation.

In step S54, the obliquity analysis module 42 determines whether the current obliquity of the object is equal to the reference angle. If the current obliquity of the object is equal to the reference angle, step S52 is repeated for measuring orientation data of the object using the electric gyroscope 1. Otherwise, if the current obliquity of the object is not equal to the reference angle, step S55 is implemented.

In step S55, the obliquity adjusting module 43 generates a first control signal according to the current obliquity of the object, and sends the first control signal to drive the driver device 2.

Figure 4:
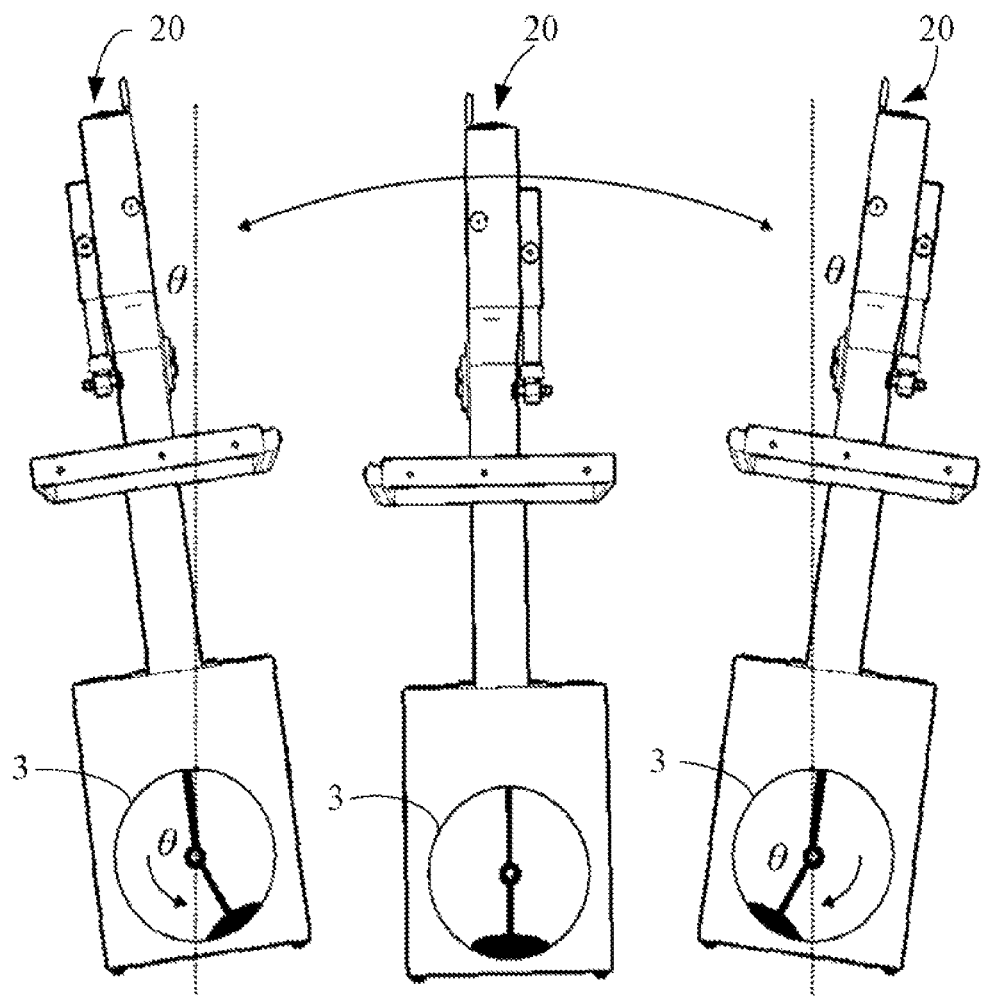
FIG. 4 is a schematic diagram illustrating one example of changing the center of gravity of the measuring machine object using the counterweight device of FIG. 3.

In step S56, the obliquity adjusting module 43 controls the counterweight device 3 to change a current center of gravity of the object through the driver device 2, and measures an adjusted obliquity of the object using the electric gyroscope 1. FIG. 4 is a schematic diagram illustrating one example of change the center of gravity of the measuring machine 20 using the counterweight device 3. When the current obliquity of the measuring machine 20 is an angle "θ", the counterweight device 3 changes the center of gravity of the measuring machine 20 to maintain the balancing state of the measuring machine 20.

In step S57, the weight counterbalance module 44 determines whether the adjusted obliquity of the object is equal to the reference angle. If the adjusted obliquity of the object is equal to the reference angle, step S55 is implemented. Otherwise, if the adjusted obliquity of the object is not equal to the reference angle, step S58 is implemented.

In step S58, the weight counterbalance module 44 determines whether the adjusted obliquity of the object changes in a time period, such as 2 seconds or 5 seconds, for example. If the adjusted obliquity of the object changes, step S55 is implemented. Otherwise, if the adjusted obliquity of the object does not change, step S59 is implemented.

In step S59, the weight counterbalance module 44 generates a second control signal according to the adjusted obliquity of the object, and drives the driver device 2 using the second control signal to control the counterweight device 3 to adjust the current center of gravity of the object to resume the initial center of gravity of the object. When the object does not receive the impact force, the weight counterbalance module 44 drives the driver device 2 using the second control signal, and resumes the gravitational position of the object using the counterweight device 3, so that the stability of the object can be maintained.

All of the processes described above may be embodied in, and fully automated via, functional code modules executed by one or more general purpose processors of computing devices. The code modules may be stored in any type of non-transitory readable medium or other storage device. Some or all of the methods may alternatively be embodied in specialized hardware. Depending on the embodiment, the non-transitory readable medium may be a hard disk drive, a compact disc, a digital video disc, a tape drive or other suitable storage medium.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. An electronic stabilizer device, comprising:
   an electric gyroscope, a driver device, and a counterweight device; and
   an object stabilizing system comprising one or more programs that is stored in a storage system and executed by at least one microprocessor, the one or more programs comprising:
   an initialization module that sets an initialization obliquity of an object to be monitored as a reference angle when the object is placed in a balance state;
   an obliquity analysis module that measures orientation data of the object using the electric gyroscope, analyzes the orientation data of the object to obtain a current obliquity of the object, and determines whether the current obliquity of the object is equal to the reference angle;
   an obliquity adjusting module that generates a first control signal to drive the driver device according to the current obliquity of the object when the current obliquity of the object is not equal to the reference angle, controls the counterweight device to change a center of gravity of the object through the driver device, and measures an adjusted obliquity of the object using the electric gyroscope; and
   a weight counterbalance module that determines whether the adjusted obliquity of the object changes in a time period, generates a second control signal to drive the driver device according to the adjusted obliquity of the object when the adjusted obliquity of the object does not change in the time period, and controls the counterweight device to adjust the center of gravity of the object to an initial center of gravity of the object.

2. The electronic stabilizer device according to claim 1, wherein the electric gyroscope is an integrated circuit (IC) chipset that measures the orientation data of the object based on conservation of angular momentum.

3. The electronic stabilizer device according to claim 2, wherein the orientation data of the object comprise an obliquity of the object, an angular velocity of the object, and a rotational direction of the object.

4. The electronic stabilizer device according to claim 1, wherein the counterweight device is an electric hydraulic jack that allocates the weight of the object to change the center of gravity of the object when the object receives a impact force.

5. The electronic stabilizer device according to claim 4, wherein the driver device is a driving motor that controls the counterweight device to change the center of gravity of the object to obtain a counterweight of the object against a direction of the impact force.

6. The electronic stabilizer device according to claim 1, wherein the counterweight device comprises a spherical shell, a first joint lever, and a second joint lever that is equipped with a weight, and wherein the first joint lever moves up and down, and the second joint lever rotates through 360 degrees.

7. A method for stabilization of an object using an electronic stabilizer device, the method comprising:

setting an initialization obliquity of the object as a reference angle when the object is placed in a balance state;

measuring orientation data of the object using an electric gyroscope of the electronic stabilizer device;

analyzing the orientation data of the object to obtain a current obliquity of the object;

determining whether the current obliquity of the object is equal to the reference angle;

generating a first control signal to drive a driver device of the electronic stabilizer device according to the current obliquity of the object if the current obliquity of the object is not equal to the reference angle;

controlling a counterweight device of the electronic stabilizer device to change a center of gravity of the object through the driver device, and measuring an adjusted obliquity of the object using the electric gyroscope;

determining whether the adjusted obliquity of the object changes in a time period;

generating a second control signal to drive the driver device according to the adjusted obliquity of the object if the adjusted obliquity of the object does not change in the time period; and controlling the counterweight device to adjust the center of gravity of the object to an initial center of gravity of the object.

8. The method according to claim 7, wherein the electric gyroscope is an integrated circuit (IC) chipset that measures the orientation data of the object based on conservation of angular momentum principle.

9. The method according to claim 8, wherein the orientation data of the object comprise an obliquity of the object, an angular velocity of the object, and a rotational direction of the object.

10. The method according to claim 7, wherein the counterweight device is an electric hydraulic jack that allocates the weight of the object to change the center of gravity of the object when the object receives a impact force.

11. The method according to claim 10, wherein the driver device is a driving motor that controls the counterweight device to change the center of gravity of the object to obtain a counterweight of the object against a direction of the impact force.

12. The method according to claim 7, wherein the counterweight device comprises a spherical shell, a first joint lever, and a second joint lever that is equipped with a weight, and wherein the first joint lever moves up and down, and the second joint lever rotates through 360 degrees.

13. A non-transitory computer-readable storage medium having stored thereon instructions that, when executed by at least one microprocessor of an electronic stabilizer device, causes the device to perform a method for stabilization of an object, the method comprising:

setting an initialization obliquity of the object as a reference angle when the object is placed in a balance state;

measuring orientation data of the object using an electric gyroscope of the electronic stabilizer device;

analyzing the orientation data of the object to obtain a current obliquity of the object;

determining whether the current obliquity of the object is equal to the reference angle;

generating a first control signal to drive a driver device of the electronic stabilizer device according to the current obliquity of the object if the current obliquity of the object is not equal to the reference angle;

controlling a counterweight device of the electronic stabilizer device to change a center of gravity of the object through the driver device, and measuring an adjusted obliquity of the object using the electric gyroscope;

determining whether the adjusted obliquity of the object changes in a time period;

generating a second control signal to drive the driver device according to the adjusted obliquity of the object if the adjusted obliquity of the object does not change in the time period; and controlling the counterweight device to adjust the center of gravity of the object to an initial center of gravity of the object.

14. The storage medium according to claim 13, wherein the electric gyroscope is an integrated circuit (IC) chipset that measures the orientation data of the object based on conservation of angular momentum principle.

15. The storage medium according to claim 14, wherein the orientation data of the object comprise an obliquity of the object, an angular velocity of the object, and a rotational direction of the object.

16. The storage medium according to claim 13, wherein the counterweight device is an electric hydraulic jack that allocates the weight of the object to change the center of gravity of the object when the object receives a impact force.

17. The storage medium according to claim 16, wherein the driver device is a driving motor that controls the counterweight device to change the center of gravity of the object to obtain a counterweight of the object against a source direction of the impact force.

18. The storage medium according to claim 13, wherein the counterweight device comprises a spherical shell, a first joint lever, and a second joint lever that is equipped with a weight, and wherein the first joint lever moves up and down, and the second joint lever rotates through 360 degrees.

* * * * *